(12) United States Patent
Kawabe

(10) Patent No.: US 7,402,645 B2
(45) Date of Patent: Jul. 22, 2008

(54) SOLUBLE POLYFUNCTIONAL VINYL AROMATIC POLYMER AND METHOD OF PRODUCING THE SAME

(75) Inventor: Masanao Kawabe, Fukuoka (JP)

(73) Assignee: Nippon Steel Chemical Co., Ltd., Tokyo (JP)

( * ) Notice: Subject to any disclaimer, the term of this patent is extended or adjusted under 35 U.S.C. 154(b) by 174 days.

(21) Appl. No.: 10/586,969

(22) PCT Filed: Jan. 26, 2005

(86) PCT No.: PCT/JP2005/001000

§ 371 (c)(1),
(2), (4) Date: Jul. 25, 2006

(87) PCT Pub. No.: WO2005/073258

PCT Pub. Date: Aug. 11, 2005

(65) Prior Publication Data

US 2007/0155923 A1   Jul. 5, 2007

(30) Foreign Application Priority Data

Jan. 30, 2004   (JP) .............................. 2004-024154

(51) Int. Cl.
C08F 236/20 (2006.01)
C08F 136/20 (2006.01)
C08F 2/06 (2006.01)
C08F 4/14 (2006.01)

(52) U.S. Cl. ................ 526/336; 526/135; 526/146; 526/147; 526/209; 526/216; 526/217; 526/221; 526/222; 526/237; 526/284; 526/347

(58) Field of Classification Search ................ 526/135, 526/146, 147, 209, 216, 217, 221, 222, 237, 526/284, 336, 347
See application file for complete search history.

(56) References Cited

U.S. PATENT DOCUMENTS 3,049,525 A * 8/1962 Benning ................. 526/90

FOREIGN PATENT DOCUMENTS

| JP | 56-62808 | 5/1981 |
|---|---|---|
| JP | 58-76411 | 5/1983 |
| JP | 59-145207 | 8/1984 |
| JP | 6-157627 | 6/1994 |
| JP | 2003-55420 | 2/2003 |
| JP | 2003-292504 | 10/2003 |

OTHER PUBLICATIONS

Nitadori, Y., et al.; "Synthesis of Soluble Poly (divinylbenzene) by Lithium Amide Catalyzed Anionic Polymerization;" *Makromol Chem*; vol. 179, pp. 2069-2073. (1978).

Nagasaki, Y., et al.; "Synthesis of soluble poly (divinylbenzene-*co*-styrene) and poly (divinylbenzene-*co*-vinylpyridine) by lithium amide-initiated anionic copolymerization;" *Makromol Chem*; vol. 189, pp. 723-731. (1988).

Hasegawa, H., et al.;"Synthesis of Linear Poly(divinylbenzene) through Proton-Transfer Polyaddition by Oxo Acids;" *Macromolecules*; vol. 13, pp. 1350-1354. (1980).

Higashimura, T., et al.; "Synthesis of α,ω-Bifunctional Linear Poly (divinylbenzene);" *Macromolecules*; vol. 15, No. 5, pp. 1221-1225. (1982).

* cited by examiner

*Primary Examiner*—Fred M Teskin
(74) *Attorney, Agent, or Firm*—Edwards Angell Palmer & Dodge LLP

(57) ABSTRACT

The present invention relates to a soluble polyfunctional vinylaromatic copolymer improved in heat resistance, resistance to thermal decomposition, solvent solubility, and processability. The soluble polyfunctional vinylaromatic polymer is obtained by cationically polymerizing, at a temperature of 20 to 120° C., one or more monomer ingredients including 20 to 100 mol % divinylaromatic compound (a) in the presence of a donor ingredient, e.g., a quaternary ammonium salt, with the aid of a Lewis acid catalyst and an initiator represented by the following general formula (1)

$$\left( Z - \underset{R^1}{\overset{R^1}{C}} \right)_p R^2 \quad (1)$$

wherein $R^1$ represents hydrogen or a monovalent $C_{1-6}$ hydrocarbon group; $R^2$ represents an aromatic or aliphatic hydrocarbon group having a valence of p; Z represents halogen or $C_{1-6}$ alkoxy or acyloxy; and p is an integer of 1 to 6; provided that when two or more $R^1$'s and Z's are present per molecule, they may be identical to different from each other.

15 Claims, No Drawings

SOLUBLE POLYFUNCTIONAL VINYL AROMATIC POLYMER AND METHOD OF PRODUCING THE SAME

TECHNICAL FIELD

The present invention relates to a soluble polyfunctional vinyl aromatic polymer having improved heat resistance, thermal stability, solvent solubility, and processability, and to a method of producing the same.

BACKGROUND ART

Many monomers having reactive unsaturated bonds are capable of producing polymers by selecting a catalyst for cleaving the unsaturated bonds and causing a chain reaction and appropriate reaction conditions. In general, there are various monomers having unsaturated bonds, and thus various resins should be obtained. However, the number of monomers each capable of obtaining a polymer having a molecular weight of 10,000 or more and generally referred to as a polymer compound is relatively small. Typical examples of such monomers include ethylene, substituted ethylene, propylene, substituted propylene, styrene, alkylstyrene, alkoxystyrene, norbornene, various acrylates, butadiene, cyclopentadiene, dicyclopentadiene, isoprene, maleic anhydride, maleimide, fumarate ester, and an alkyl compound. A wide variety of resins are synthesized by polymerizing one kind of monomer or by copolymerizing those monomers.

Applications of those resins are mainly limited to fields of relatively inexpensive consumer appliances. The resins are hardly applied to advanced technology fields relating to electronic substrates and the like because heat resistance, thermal stability, solvent solubility, and processability cannot be attained simultaneously.

Examples of the prior documents related to the present invention include the following.

Patent Document 1: JP02-170806 A
Patent Document 2: JP 2000-128908 A
Patent Document 3: JP 2001-512752 A
Patent Document 4: U.S. Pat. No. 5,767,211
Patent Document 5: JP 2002-194025 A
Non Patent Document 1: Makromol. Chem., 1978, Vol. 179, P2069-2073
Non Patent Document 2: Makromol. Chem., 1988, Vol. 189, P723-731
Non Patent Document 3: Macromolecules, 1980, Vol. 13, P1350-1354
Non Patent Document 4: Macromolecules, 1982, Vol. 15, P1221-1225

As a method of solving such problems of a vinyl-based polymer, resin properties such as strength are improved by adding a trace amount of a polyfunctional vinyl aromatic compound such as a divinyl aromatic compound or a trivinyl aromatic compound to the vinyl-based monomer. For example, JP-A-02-170806 discloses copolymerization of a polyfunctional aromatic compound and a styrene-based monomer with heat or an initiator, to thereby obtain a styrene-based polymer having a broad molecular weight distribution and exhibiting high impact strength. However, increase in polymerization yield following the disclosed technology rapidly causes a cross-linking reaction of the polyfunctional vinyl aromatic compound. Thus, in the case where the aromatic polyfunctional vinyl compound is present in a large amount, gel formation of a resin occurs and processability and appearance of the resin are significantly degraded. Thus, conventionally performed modification of a resin with an aromatic polyfunctional vinyl compound is not sufficiently effective for applications to advanced technology fields because an addition amount of the polyfunctional vinyl aromatic compound is suppressed low to 50 to 250 ppm.

Further, JP-A-2000-128908 discloses a styrene-based polymer having a controlled branching degree by using a polyfunctional chain transfer agent in combination with a polyfunctional vinyl aromatic polymer and a method of producing the styrene-based polymer. However, an addition amount of the polyfunctional vinyl aromatic polymer is suppressed to 1 to 700 ppm with respect to an amount of a styrene-based monomer. A polymer obtained through polymerization by mixing a large amount of a polyfunctional vinyl aromatic compound usually has a highly developed cross-linking structure and often forms into an insoluble and infusible gel polymer without processability.

Meanwhile, a hyperbranched (highly branched) polymer formed of highly branched polymer chains has little entanglement of molecular chains, has a low viscosity compared with that of a linear polymer having a similar molecular weight, and has attracted attention as a highly functional polymer capable of introducing many reactive groups into branches. JP-A-2001-512752 discloses a method of producing a hyperbranched polymer through polymerization of 50 to 99.9 parts by weight of a monofunctional vinyl monomer and 0.1 to 50 parts by weight of a polyfunctional vinyl aromatic monomer at 250 to 400° C. in the presence of a radical polymerization initiator. However, results disclosed in Examples of JP-A-2001-512752 indicate that a molecular weight distribution of a polymer obtained by adding 6 to 25% of the polyfunctional vinyl aromatic compound is represented by a very high value of 60 or more because a cross-linking reaction is liable to occur during polymerization. Thus, the technique disclosed herein does not allow increase in addition amount of the polyfunctional vinyl compound and thus modification with a polyfunctional vinyl aromatic compound is not sufficiently effective for applications to advanced technology fields.

Further, U.S. Pat. No. 5,767,211 discloses a method of producing a hyperbranched polymer having no cross-linking structure through polymerization of a bifunctional to trifunctional vinyl compound in the presence of an azo-based radical polymerization initiator and a cobalt-based chain transfer catalyst. However, this polymerization method uses a chain transfer catalyst capable of accelerating β-hydrogen release for producing a branched structure, and thus a produced polymer has a structure with a double bond in a vicinity of the branched structure. Thus, even if a heat-curing operation for enhancing heat resistance of the produced polymer is performed, an effect of improving the heat resistance is small because reactivity of the polymer is low. This method has a disadvantage in that it is not appropriate for applications to advanced technology fields. In this method, a chain transfer reaction is mainly dependent on chain transfer capability of the cobalt-based chain transfer catalyst. Thus, a large amount of the chain transfer catalyst must be added to a polymerization system. This method had problems for practical use such as significantly reduced polymerization rate and difficulties in removal of the catalyst during recovery of the polymer.

Makromol. Chem. (p. 2069 to 2073, vol. 179, 1987) discloses a method of obtaining a solvent-soluble divinylbenzene polymer by performing anionic polymerization of divinylbenzene with di-iso-propylamine and butyl lithium as catalysts. Further, Makromol. Chem. (p. 723 to 731, vol. 189, 1988) discloses a method of obtaining a solvent-soluble divinylbenzene/styrene copolymer by performing anionic polymerization of divinylbenzene and styrene with lithium di-iso-propylamide as a catalyst. However, in the anionic polymerization method disclosed in those documents, selectivity of a vinyl group during polymerization is not sufficient and gel formation is liable to occur. Thus, the methods not only have problems in that a monomer concentration cannot be increased and a polymerization temperature cannot be increased to higher than 0° C., but also have problems of trace amounts of impurities in a polymerization system for progress of the polymerization. For example, water must be completely removed for progress of the polymerization. The methods have problems in industrial application in that purification of a solvent or a polymer during production involves difficulties and a polymerization reaction has low efficiency because the monomer concentration cannot be increased.

In comparison with the anionic polymerization method, a cationic polymerization method is generally known to have a small effect of impurities on polymerization and to have no problems with mixing of about 0.04 to 0.06 mole of water per 1 mole of a polymerization initiator. Thus, production of a polymer having an aromatic divinyl compound through the cationic polymerization method is expected to realize synthesis of the intended polymer without requiring advanced purification operations for the monomer and the solvent. Conventionally, Macromolecules p. 1350 to 1354, vol. 13, 1980 and Macromolecules p. 1221 to 1225, vol. 15, 1982 each disclose a method of obtaining a solvent-soluble divinylbenzene polymer by performing cationic polymerization of divinylbenzene with acetyl perchlorate as a catalyst. However, the divinylbenzene polymer to be obtained through each of the production methods disclosed in those non-patent documents has a carbon-carbon double bond in a form of an internal olefin alone. Thus, the carbon-carbon double bond has low reactivity, and a curing reaction does not proceed sufficiently in heat-curing. Thus, the divinylbenzene polymer to be obtained has a disadvantage of low heat resistance, that is, insufficient properties as a material used in advanced technology fields. The divinylbenzene polymer to be obtained through each of the production methods disclosed in those non-patent documents has a broad molecular weight distribution, and thus has disadvantages of high viscosity of a resin during molding and difficulties in forming process.

Thus, highly efficient production of a soluble polyfunctional vinyl aromatic polymer having a controlled molecular weight distribution, solving the various problems of the conventional techniques, and having a vinyl group on a pendant position by using a divinyl aromatic compound without requiring advanced purification operations for the monomer and the solvent has not been imagined.

Disclosure of the Invention

Problem to be Solved by the Invention

An object of the present invention is to provide a highly efficient method of producing a soluble polyfunctional vinyl aromatic polymer having a controlled molecular weight distribution.

Means for Solving the Problem

The present invention relates to a method of producing a soluble polyfunctional vinyl aromatic polymer having a controlled molecular weight distribution, characterized by including performing cationic polymerization of a monomer component containing 20 to 100 mol % of a divinyl aromatic compound (a) at a temperature of 20 to 120° C. in an organic solvent in the presence of a donor component selected from the group consisting of a quaternary ammonium salt, an ether-based compound having 3 or more carbon atoms, a thioether-based compound having 3 or more carbon atoms, and a sulfoxide-based compound having 2 or more carbon atoms with a Lewis acid catalyst and an initiator represented by the following general formula (1):

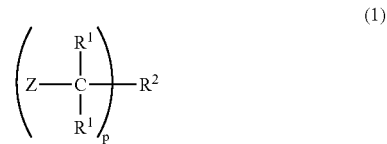

wherein $R^1$ represents a hydrogen atom or a monovalent hydrocarbon group having 1 to 6 carbon atoms, $R^2$ represents an aromatic hydrocarbon group or aliphatic hydrocarbon group of p-valence, Z represents a halogen atom, or an alkoxy group or acyloxy group having 1 to 6 carbon atoms, p represents an integer of 1 to 6, and when a plurality of $R^1$s and Zs are present in a molecule, $R^1$s and Zs may be identical to or different from each other. Further, the present invention relates to a method of producing a soluble polyfunctional vinyl aromatic polymer having a controlled molecular weight distribution, characterized by including performing cationic polymerization of the above-mentioned monomer component in at least one organic solvent having a dielectric constant of 2 to 15 with a Lewis acid catalyst and an initiator represented by the general formula (1). The donor component preferably employs at least one kind of quaternary ammonium salt, ether-based compound having 3 or more carbon atoms, thioether-based compound having 3 or more carbon atoms, or sulfoxide-based compound having 2 or more carbon atoms selected from the group consisting of a tetraalkylammonium halide, a dialkyl ether having 3 or more carbon atoms, a bisalkoxy alkyl, a cycloalkyl ether, a biphenyl ether-based compound, a dialkyl thioether having 3 or more carbon atoms, a bisthioalkoxy alkyl, cycloalky thioether, a dialkyl sulfoxide having 2 or more compounds, and a biphenyl sulfoxide-based compound. A preferred example of the Lewis acid catalyst is a halogenated metal having Lewis acidity. The monomer component preferably contains 30 to 99 mol % of the divinyl aromatic compound (a) and 1 to 70 mol % of a monovinyl aromatic compound (b).

The soluble polyfunctional vinyl aromatic polymer produced by the present invention preferably has a mole fraction of structural units derived from the divinyl aromatic compound (a) and represented by the following formulae (a1) and (a2):

wherein $R^3$ and $R^4$ each independently represent an aromatic hydrocarbon group having 6 to 30 carbon atoms, the mole fraction satisfying the following expression (a1)/[(a1)+(a2)]≧ 0.5, has 0 to 20 mol % of an indan structure represented by the following general formula (2) in a main chain skeleton:

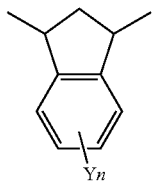

(2)

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, has a number average molecular weight Mn of 300 to 100,000, has a molecular weight distribution (Mw/Mn) represented by a ratio of a weight average molecular weight Mw to the number average molecular weight Mn of 10.0 or less, and is soluble in toluene, xylene, tetrahydrofuran, dichloroethane, or chloroform.

A method of producing a soluble polyfunctional vinyl aromatic polymer according to the present invention, in which the polymerization is performed in an organic solvent capable of dissolving a soluble polyfunctional vinyl aromatic copolymer by using the donor component, the Lewis acid catalyst, and the initiator represented by the general formula (1) to be used a method of producing in the present invention within a range of 0.001 to 100 moles of the Lewis acid and 0.001 to 10 moles of the donor component per 1 mole of the initiator.

In a polyfunctional vinyl aromatic copolymer including structural units derived from monomers formed of a divinyl aromatic compound (a) and a monovinyl aromatic compound (b), a soluble polyfunctional vinyl aromatic copolymer in the present invention is characterized in that: 20 mol % or more of a repeating unit derived from the divinyl aromatic compound (a) is included in the soluble polyfunctional vinyl aromatic copolymer; a mole fraction of structural units derived from the divinyl aromatic compound (a) and represented by the following formulae (a1) and (a2), satisfies the following expression (a1)/[(a1)+(a2)]≧0.5; and an indan structure represented by the following general formula (2) in a main chain skeleton.

In the method of producing a soluble polyfunctional aromatic vinyl polymer of the present invention, the monomer component containing 20 to 100 mol % of a divinyl aromatic compound is polymerized at a temperature of 20 to 120° C. in at an organic solvent in the presence of a Lewis acid catalyst and an initiator. In this case, a donor component is present or an organic solvent having a dielectric constant of 2 to 15 is used.

A donor component used in the present invention is added to a polymerization system with a Lewis acid catalyst and an initiator to stabilize a growing terminal by catione polymerization. When the donor component is not added, a polymerization reaction proceeds rapidly. However, the molecular weight distribution cannot be controlled because of a wide molecular weight distribution of the obtained molecule. Tetraalkylammonium halide is preferably used as a quaternary ammonium salt used as a doner component. Chloride, bromide, and iodide are preferably used as halide, and alkyl having 1 to 12 carbon atoms is preferably used. Note that all alkyl groups of tetraalkyl may not be identical. Specific examples of tetraalkylammonium halide preferably include tetrabutylammonium chloride, tetrabutylammonium bromide, and tetrabutylammonium iodide. In addition, examples of an ether-based compound having 3 or more carbon atoms include a dialkyl ether, bisalkoxy alkyl, cycloalkyl ether, and biphenyl ether-based compound. Specific examples of the ether-based compound preferably include tetrahydrofuran, 1,2-dimethoxy ethane, and 1,2-dioxane, biphenyl ether. Meanwhile, examples of a thioether-based compound having three or more carbon atoms include dialkylthio ether, bisthioalkoxy alkyl, cycloalkylthioether, and biphenylsulfide-based compound, having carbon atoms of three or more. Specific examples of a thioether-based compound preferably include diethylsulfide, butylmethylsulfide, benzylmethylsulfide, benzylphenylsulfide, and biphenylsulfide. Specific examples of a sulfoxide-based compound having 2 or more carbon atoms preferably include dimethylsulfoxide, and biphenylsulfoxide.

The Lewis acid catalyst to be used in the present invention is preferably exemplified by a metal halide which exhibits Lewis acidity or a complex thereof. Examples of the metal halide include halides of divalent to hexavalent metals such as B, Al, Ga, In, Ta, Si, Ge, Sn, Pb, Sb, Bi, Ti, W, Zn, Fe, and V and examples of halogen include F, Cl, Br, and I. Specific examples thereof can include: a metal halide such as boron (III) bromide, boron (III) chloride, aluminum (III) bromide, aluminum (III) fluoride, aluminum (III) chloride, aluminum (III) iodide, gallium (III) bromide, gallium (III) chloride, indium (III) bromide, indium (III) chloride, indium (III) fluoride, indium (III) iodide, thallium (III) bromide, thallium (III) fluoride, silicon (IV) bromide, silicon (IV) chloride, silicon (IV) fluoride, silicon (IV) iodide, germanium (IV) bromide, germanium (IV) chloride, germanium (IV) iodide, tin (IV) bromide, tin (IV) chloride, tin (IV) fluoride, tin (IV) iodide, zinc (IV) fluoride, antimony (III) bromide, antimony (III) chloride, antimony (V) chloride, antimony (III) fluoride, antimony (V) fluoride, antimony (III) iodide, bismuth (III) bromide, bismuth (III) chloride, bismuth (III) fluoride, bismuth (III) iodide, titanium (IV) chloride, titanium (IV) bromide, $BF^3/OEt_2$, tungsten (VI) chloride, vanadium (V) chloride, iron (III) chloride, or zinc (II) bromide; and an organic metal halide such as $Et_2AlCl$ or $EtAlCl_2$. However, the above-mentioned catalysts are not particularly limited, and one kind of the catalysts can be used or two or more kinds of them can be used in combination. Of the above-mentioned catalysts, boron (III) bromide, boron (III) chloride, tin (IV) chloride, tin (IV) bromide, tin (IV) chloride, tin (IV) fluoride, tin (IV) iodide, and antimony (V) chloride are preferred from the viewpoints of control of the branching structure and polymerization activity. Boron (III) chloride and tin (IV) chloride are more preferred and tin (IV) chloride is particularly preferred.

As the initiator to be used in the present invention, the compound represented by the general formula (1) is used. In the general formula (1), $R^1$ represents a hydrogen atom or a monovalent hydrocarbon group having 1 to 6 carbon atoms, the monovalent hydrocarbon group is preferably exemplified by an alkyl group. $R^2$ represents an aromatic hydrocarbon group or aliphatic hydrocarbon group of p-valence, and the aromatic hydrocarbon group is preferably exemplified by monovalent to trivalent aromatic hydrocarbon groups of single rings. Z represents a halogen atom, or an alkoxy group or acyloxy group having 1 to 6 carbon atoms, and the halogen atom such as chlorine is preferably exemplified. p represents an integer of 1 to 6, and preferably 1 to 3. Note that when a plurality of $R^1$s and Zs are present in a molecule, $R^1$s and Zs may be identical to or different from each other.

Examples of the initiator to be used in the present invention include compounds such as (1-chlor-1-methylethyl)benzene $[C_6H_5C(CH_3)_2Cl]$, 1,4-bis(1-chlor-1-methylethyl)benzene $[1,4-Cl(CH_3)_2CC_6H_4C(CH_3)_2Cl]$, 1,3-bis(1-chlor-1-methylethyl)benzene [1,3-Cl(CH$_3$)$_2$CC$_6$H$_4$C(CH$_3$)$_2$Cl], 1,3,5-tris (1-chlor-1-methylethyl)benzene [1,3,5-(ClC(CH$_3$)$_2$)$_3$C$_6$H$_3$], 1,3-bis(1-chlor-1-methylethyl)-5-(tert-butyl)benzene [1,3-(C(CH$_3$)$_2$Cl)$_2$-5-(C(CH$_3$)$_3$)C$_6$H$_3$], 1-chloroethylbenzene, 1-bromoethylbenzene, n-butyl bromide, n-propyl bromide, tert-butyl bromide, sec-butyl bromide, and benzyl chloride. Of those, 1-chloroethylbenzene, 1-bromoethylbenzene, and bis(1-chlor-1-methylethyl)benzene and benzyl chloride are preferred from the viewpoints of reactivity and availability.

A use amount of the Lewis acid catalyst is within a range of generally 0.001 to 100 times moles, preferably 0.003 to 50 times moles, more preferably 0.01 to 10 times moles, and particularly preferably 0.3 to 50 times moles with respect to an amount of the initiator represented by the general formula (1). A use amount of the Lewis acid catalyst of less than 0.001 time mole with respect to the amount of the initiator represented by the general formula (1) undesirably reduces a polymerization rate significantly. A use amount of 100 times moles or more with respect to the amount of the initiator represented by the general formula (1) undesirably increases a polymerization rate excessively and causes difficulties in control of a polymerization reaction.

In addition, in the case where the donor component is used, its use amount is within a range of generally 0.001 to 10 times moles, preferably 0.003 to 5 times moles, and particularly preferably 0.01 to 2 times moles with respect to an amount of the initiator represented by the general formula (1). A use amount of the donor component of less than 0.001 time mole with respect to the amount of the initiator represented by the general formula (1) undesirably causes difficulties in control of a molecular weight distribution. A use amount of 100 times moles or more with respect to the amount of the initiator represented by the general formula (1) undesirably reduces a polymerization rate significantly.

The polymerization reaction is preferably performed in an organic solvent capable of dissolving a soluble polyfunctional vinyl aromatic polymer to be produced. Of those, at least one organic solvent having a dielectric constant of 2 to 15 is preferably used. A compound substantially not inhibiting cationic polymerization may be used as the organic solvent without particular limitation, and one kind of organic solvent or two or more kinds thereof in combination are preferably used as a polymerization solvent such that a dielectric constant falls within a range of 2 to 15. Examples of a compound that may be used as the organic solvent include: halogenated hydrocarbons such as methyl chloride, dichloromethane, n-propyl chloride, n-butyl chloride, chloromethane, trichloromethane, tetrachloromethane, chloroethane, dichloroethane, trichloroethane, tetrachloroethane, chloroethylene, dichloroethylene, chlorobenzene, chlorobenzene, dichlorobenzene, and trichlorobenzene; aromatic hydrocarbons such as benzene, toluene, xylene, ethylbenzene, propylbenzene, and butylbenzene; straight-chain aliphatic hydrocarbons such as ethane, propane, butane, pentane, hexane, heptane, octane, nonane, and decane; branched aliphatic hydrocarbons such 2-methylpropane, 2-methylbutane, 2-3,3-trimethylpentane, and 2,2,5-trimethylhexane; cyclic aliphatic hydrocarbons such as cyclohexane, methylcyclohexane, and ethylcyclohexane; and paraffin oil having a petroleum fraction subjected to hydrogenation refining. Of those, preferred examples of a compound that may be used as the organic solvent include dichloroethane, toluene, xylene, pentane, hexane, heptane, octane, 2-methylpropane, 2-methylbutane, methylcyclohexane, and ethylcyclohexane. More preferred examples thereof include dichloroethane, toluene, xylene, n-hexane, cyclohexane, heptane, methylcyclohexane, and ethylcyclohexane from the viewpoint of balance between polymerizability and solubility, and availability.

One kind of compound or two or more kinds thereof in combination are used such that a dielectric constant is adjusted to 2 to 15. A use amount of the solvent is determined such that a polymer concentration is generally 1 to 50 wt %, and preferably 5 to 35 wt % in consideration of a viscosity of a polymer solution to be obtained and ease of heat removal. A dielectric constant of less than 2 undesirably degrades polymerization activity, and a dielectric constant of more than 15 undesirably causes gel formation during polymerization. In the case where an organic solvent having a dielectric constant of 2 to 15 is used, a use amount of the donor component may be 0.

In polymerization, a volume A of the monomer component containing an aromatic divinyl compound and a volume B of the organic solvent desirably satisfy the expression $0.1 \leq A/(A+B) \leq 0.95$. A volume fraction of the monomer component of less than 0.1 undesirably reduces copolymer production efficiency and causes cost increase in industrial application. A volume fraction thereof of more than 0.95 undesirably causes gel formation during production.

In the production method of the present invention, the polymerization is preferably performed within a temperature range of 20 to 120° C., and preferably 20 to 100° C. A polymerization reaction at a temperature lower than 20° C. undesirably degrades heat resistance of a copolymer to be produced. A polymerization reaction at a temperature higher than 120° C. undesirably degrades selectivity in a reaction, causes difficulties in control of the reaction, and causes formation of a soluble gel due to cross-linking.

After completion of the polymerization reaction, a method of recovering the copolymer is not particularly limited. Examples thereof include methods usually employed such as a steam stripping method and a method involving precipitation in a poor solvent.

The monomer component as the raw material to be used in the production method of the present invention includes 20 to 100 mol % of the divinyl aromatic compound (a) and another monomer component (b) added as required.

Examples of the divinyl aromatic compound (a) which provides a structural unit mainly serving as a cross-linking component when the polyfunctional aromatic polymer obtained through the producing method of the present invention expresses the heat resistance by being thermally cured include, but not limited to, m-divinylbenzene, p-divinylbenzene, 1,2-diisopropenylbenzene, 1,3-diisopropenylbenzene, 1,4-diisopropenylbenzene, 1,3-divinyinaphthalene, 1,8-divinyinaphthalene, 1,4-divinyinaphthalene, 1,5-divinyinaphthalene, 2,3-divinylnaphthalene, 2,7-divinyinaphthalene, 2,6-divinylnaphthalene, 4,4'-divinylbiphenyl, 4,3'-divinylbiphenyl, 4,2'-divinylbiphenyl, 3,2'-divinylbiphenyl, 3,3'-divinylbiphenyl, 2,2'-divinylbiphenyl, 2,4-divinylbiphenyl, 1,2-divinyl-3,4-dimethylbenzene, 1,3-divinyl-4,5,8-tributylnaphthalene, and 2,2'-divinyl-4-ethyl-4'-propylbiphenyl. Each of those compounds can be used alone, or two or more kinds thereof can be used in combination.

Here, preferred specific examples of the component include divinylbenzene (including both m- and p-isomers), divinylbiphenyl (including all isomers), and divinyinaphthalene (including all isomers) from the viewpoints of cost and heat resistance of a polymer to be obtained. More preferred specific examples thereof include divinylbenzene (including both m- and p-isomers) and divinylbiphenyl (including all isomers). In particular, a most preferred example thereof is divinylbenzene (including both m- and p-isomers). In a field requiring a high level of heat resistance, in particular, divinylbiphenyl (including all isomers) and divinylnaphthalene (including all isomers) are preferably used.

In order to improve solvent-solubility and workability of the polyfunctional vinyl aromatic copolymer obtained through the producing method of the present invention, the ethylvinyl aromatic compound is advantageously added as the component (b). Examples of the ethylvinyl aromatic compound include, but not limited to, o-ethylvinyl benzene, m-ethylvinyl benzene, p-ethylvinyl benzene, 2-vinyl-2'-ethylbiphenyl, 2-vinyl-3'-ethylbiphenyl, 2-vinyl-4'-ethylbiphenyl, 3-vinyl-2'-ethylbiphenyl, 3-vinyl-3'-ethylbiphenyl, 3-vinyl-4'-ethylbiphenyl, 4-vinyl-2'-ethylbiphenyl, 4-vinyl-3'-ethylbiphenyl, 4-vinyl-4'-ethylbiphenyl, 1-vinyl-2-ethylnaphthalene, 1-vinyl-3-ethylnaphthalene, 1-vinyl-4-ethylnaphthalene, 1-vinyl-5-ethylnaphthalene, 1-vinyl-6-ethylnaphthalene, 1-vinyl-7-ethylnaphthalene, 1-vinyl-8-ethylnaphthalene, 2-vinyl-1-ethylnaphthalene, 2-vinyl-3-ethylnaphthalene, 2-vinyl-4-ethylnaphthalene, 2-vinyl-5-ethylnaphthalene, 2-vinyl-6-ethylnaphthalene, 2-vinyl-7-ethylnaphthalene, and 2-vinyl-8-ethylnaphthalene. Those can be used alone, or two or more kinds thereof may be used in combination. Introduction of a structural unit derived from those components into a polyfunctional vinyl aromatic copolymer can not only prevent gelation of a copolymer and enhance solvent-solubility but also improve workability upon application of the polyfunctional vinyl aromatic compound. Preferred specific examples thereof include ethylvinylbenzene (including both m- and p-isomers) and ethylvinylbiphenyl (including all isomers) from the viewpoints of cost, anti-gelling, and heat resistance of a polymer to be obtained.

Other monomer to be added as the component (b) for controlling the molecular weight of the polyfunctional vinyl aromatic polymer obtained through the producing method of the present invention and for improving the compatibility with other resin is not limited to the ethyl vinyl aromatic compound and it can be another monovinyl aromatic compound (hereinafter, other monomer except the ethylvinyl aromatic compound is also referred to as the component (c)). Examples of the other monovinyl aromatic compound include: nuclear alkyl-substituted styrene excluding styrene and an ethylvinyl aromatic compound; a nuclear alkyl-substituted aromatic vinyl compound excluding an ethylvinyl aromatic compound; α-alkyl-substituted styrene; an α-alkyl-substituted aromatic vinyl compound; β-alkyl-substituted styrene; alkoxy-substituted styrene; an indene derivative; and an acenaphthylene derivative.

Example of the nuclear alkyl-substituted styrene which can be used herein include, but no limited to, o-methylstyrene, m-methylstyrene, p-methylstyrene, o-propylstyrene, m-propylstyrene, p-propylstyrene, o-n-butylstyrene, m-n-butylstyrene, p-n-butylstyrene, o-isobutylstyrene, m-isobutylstyrene, p-isobutylstyrene, o-t-butylstyrene, m-t-butylstyrene, p-t-butylstyrene, o-n-pentylstyrene, m-n-pentylstyrene, p-n-pentylstyrene, o-2-methylbutylstyrene, m-2-methylbutylstyrene, p-2-methylbutylstyrene, o-3-methylbutyl-2-styrene, m-3-methylbutylstyrene, p-3-methylbutylstyrene, o-t-butylstyrene, m-t-butylstyrene, p-t-butylstyrene, o-t-butylstyrene, m-t-butylstyrene, p-t-butylstyrene, o-n-pentylstyrene, m-n-pentylstyrene, p-n-pentylstyrene, o-2-methylbutylstyrene, m-2-methylbutylstyrene, p-2-methylbutylstyrene, o-3-methylbutylstyrene, m-3-methylbutylstyrene, p-3-methylbutyl styrene, o-t-pentylstyrene, m-t-pentylstyrene, p-t-pentylstyrene, o-n-hexylstyrene, m-n-hexylstyrene, p-n-hexylstyrene, o-2-methylpentylstyrene, m-2-methylpentylstyrene, p-2-methylpentylstyrene, o-3-methylpentylstyrene, m-3-methylpentylstyrene, p-3-methylpentylstyrene, o-1-methylpentylstyrene, m-1-methylpentylstyrene, p-1-methylpentylstyrene, o-2,2-dimethylbutylstyrene, m-2,2-dimethylburylstyrene, p-2,2-dimethylburylstyrene, o-2,3-dimethylburylstyrene, m-2,3-dimethylbutylstyrene, p-2,3-dimethylbutylstyrene, o-2,4-dimethylbutylstyrene, m-2,4-dimethylbutylstyrene, p-2,4-dimethylbutylstyrene, o-3,3-dimetylbutylstyrene, m-3,3-dimethylbutylstyrene, p-3,3-dimethylbutylstyrene, o-3,4-dimethylbutylstyrene, m-3,4-dimethylbutylstyrene, p-3,4-dimethylbutylstyrene, o-4,4-dimethylbutylstyrene, m-4,4-dimethylbutylstyrene, p-4,4-dimethylbutylstyrene, o-2-ethylbutylstyrene, m-2-ethylbutylstyrene, p-2-ethylbutylstyrene, o-1-ethylbutylstyrene, m-1-ethylbutylstyrene, p-1-ethylbutylstyrene, o-cyclohexylstyrene, m-cyclohexylstyrene, p-cyclohexylstyrene, o-cyclohexylstyrene, m-cyclohexylstyrene, p-cyclohexylstyrene, o-ethoxystyrene, m-ethoxystyrene, p-ethoxystyrene, o-propoxystyrene, m-propoxystyrene, p-propoxystyrene, o-n-butoxystyrene, m-n-butoxystyrene, p-n-butoxystyrene, o-isobutoxystyrene, m-isobutoxystyrene, p-isobutoxystyrene, o-t-butoxystyrene, m-t-butoxystyrene, p-t-butoxystyrene, o-n-pentoxystyrene, m-n-pentoxystyrene, p-n-pentoxystyrene, α-methyl-o-butoxystyrene, α-methyl-m-butoxystyrene, α-methyl-p-butoxystyrene, o-t-pentoxystyrene, m-t-pentoxystyrene, p-t-pentoxystyrene, o-n-hexoxystyrene, m-n-hexoxystyrene, p-n-hexoxystyrene, α-methyl-o-pentoxystyrene, α-methyl-m-pentoxystyrene, α-methyl-p-pentoxystyrene, o-cyclohexoxystyrene, m-cyclohexoxystyrene, p-cyclohexoxystyrene, o-phenoxystyrene, m-phenoxystyrene, and p-phenoxystyrene. Each of those can be used alone, or two or more thereof can be used in combination.

Examples of the aromatic vinyl compound which can be used herein include 2-vinylbiphenyl, 3-vinylbiphenyl, 4-vinylbiphenyl, 1-vinylnaphthalene, and 2-vinylnaphthalene.

Examples of the nuclear alkyl-substituted aromatic vinyl compound which can be used herein include 2-vinyl-2'-propylbiphenyl, 2-vinyl-3'-propylbiphenyl, 2-vinyl-4'-propylviphenyl, 3-vinyl-2'-propylbiphenyl, 3-vinyl-3'-propylbiphenyl, 3-vinyl-4'-propylbiphenyl, 4-vinyl-2'-propylbiphenyl, 4-vinyl-3'-propylbiphenyl, 4-vinyl-4'-propylbiphenyl, 1-vinyl-2-propylnaphthalene, 1-vinyl-3-propylnaphthalene, 1-vinyl-4-propylnaphothalene, 1-vinyl-5-propylnaphthalene, 1-vinyl-6-propylnaphthalene, 1-vinyl-7-propylnaphthalene, 1-vinyl-8-propylnaphthalene, 2-vinyl-1-propylnaphthalene, 2-vinyl-3-porpylnaphthalene, 2-vinyl-4-propylnaphothalen, 2-vinyl-5-propylnaphthalene, 2-vinyl-6-propylnaphthalene, 2-vinyl-7-propylnaphthalene, and 2-vinyl-8-propylnaphthalene.

Further, examples of the α-alkyl substituted styrene which can be used herein include α-methylstyrene, α-ethylstyrene, α-propylstyrene, α-n-butylstyrene, α-isobutylstyrene, α-t-butylstyrene, α-n-pentylstyrene, α-2-methylbutylstyrene, α-3-methylbutyl-2-styrene, α-t-butylstyrene, α-t-butylstyrene, α-n-pentylstyrene, α-2-methylbutylstyrene, α-3-methylbutylstyrene, α-t-pentylstyrene, α-n-hexylstyrene, α-2-methylpentylstyrene, α-3-methylpentylstyrene, α-1-methylpentylstyrene, α-2,2-dimethylbutylstyrene, α-2,3-dimethylbutylstyrene, α-2,4-dimethylbutylstyrene, α-3,3-dimethylbutylstyrene, α-3,4-dimethylbutylstyrene, α-4,4-dimethylbutylstyrene, α-2-ethylbutylstyrene, α-1-ethylbutylstyrene, α-cyclohexylstyrene, and α-cyclohexylstyrene. Examples of the α-alkyl substituted aromatic vinyl compound which can be used include 2-isopropenylbiphenyl, 3-isopropenylbiphenyl, 4-isopropenylbiphenyl, 2-isopropenyl-2'-ethylbiphenyl, 2-isopropenyl-3'-ethylbiphenyl, 2-isopropenyl-4'-ethylbiphenyl, 3-isopropenyl-2'-isopropenylbiphenyl, 3-isopropenyl-3'-ethylbiphenyl, 3-isopropenyl-4'-ethylbiphenyl, 4-isopropenyl- 2'-ethylbiphenyl, 4-vinyl-3'-ethylbiphenyl, 4-isopropenyl-4'-ethylbiphenyl, 1-isopropenylnaphthalene, 2-isopropenylnaphthalene, 1-isopropenyl-2-ethylnaphthalene, 1-isopropenyl-3-ethylnaphthalene, 1-isopropenyl-4-ethylnaphothalene, 1-isopropenyl-5-ethylnaphthalene, 1-isopropenyl-6-ethylnaphthalene, 1-isopropenyl-7-ethylnaphthalene, 1-isopropenyl-8-ethylnaphthalene, 2-isopropenyl-1-ehtylnaphthalene, 2-isopropenyl-3-ethylnaphthalen, 2-isopropenyl-4-ehtylnaphthalene, 2-isopropenyl-5-ethylnaphthalene, 2-isopropenyl-6-ethylnaphthalene, 2-isopropenyl-7-ethylnaphthalene, and 2-isopropenyl-8-ethylnaphthalene.

Examples of the indene derivative which can be used herein include an alkyl-substituted indene and the like such as indene, methylindene, ethylindene, propylindene, butylindene, t-butylindene, sec-butylindene, n-pentylindene, 2-methyl-butylindene, 3-methyl-butylindene, n-hexylindene, 2-methyl-pentylindene, 3-methyl-pentylindene, and 4-methyl-pentylindene. In addition, examples thereof which can be used herein also include alkoxyindene and the like such as methoxyindene, ethoxyindene, butoxyindene, butoxyindene, t-butoxyindene, sec-butoxyindene, n-pentoxyindene, 2-methyl-butoxyindene, 3-methyl-butoxyindene, n-hexoxyindene, 2-methyl-pentoxyindene, 3-methyl-pentoxyindene, and 4-methyl-pentoxyindene.

Examples of the acenaphthylene derivative include: acenaphthylenes such as acenaphthylene; alkylacenaphthylenes such as 1-methylacenaphthylene, 3-methylacenaphthylene, 4-methylacenaphthylene, 5-methylacenaphthylene, 1-ethylacenaphthyine, 3-ethylacenaphthylene, 4-ethylacenaphthylene, and 5-ethylacenaphthylene; halogenated acenaphthylenes such as 1-chloroacenaphthylene, 3-chloroacenaphthylene, 4-chloroacenaphthylene, 5-chloroacenaphthylene, 1-bromoacenaphthylene, 3-bromoacenaphthylene, 4-bromoacenaphthylene, and 5-bromoacenaphthylene; and phenylacenaphthylenes such as 1-phenylacenaphthylene, 3-phenylacenaphthylene, 4-phenylacenaphthylene, and 5-phenylacenaphthylene.

The monovinyl aromatic compound as the other monomer component is not limited to the examples described above. The monovinyl aromatic compound may be used alone or two or more kinds thereof may be used in combination. Of the monovinyl aromatic compounds, styrene, an α-alkyl-substituted styrene, and an α-alkyl-substituted aromatic vinyl compound are preferred in view of favorable copolymerization reactivity and high controllability of a molecular weight distribution. Most preferred specific examples of the monovinyl aromatic compound include α-methylstyrene and 4-isopropenylbiphenyl in view of cost and heat resistance of a polymer to be obtained.

In the polyfunctional vinyl aromatic copolymer of the present invention, the divinyl aromatic compound as the component (a) is used in an amount of 20 to 100 mol %, preferably 30 to 99 mol % or more, more preferably 40 to 95 mol % or more, and particularly preferably 50 to 85 mol % or more with respect to a total amount including other monomers. An amount of the divinyl aromatic compound (a) of less than 20 mol % undesirably tends to degrade heat resistance when the produced soluble polyfunctional vinyl aromatic copolymer is cured.

In addition, the ethylvinyl aromatic compound as the component (b) of the other monomer is used in an amount of 0 to 80 mol %, preferably 1 to 70 mol %, more preferably 5 to 60 mol %, and particularly preferably 15 to 50 mol % with respect to a total amount of monomers. An amount of the ethylvinyl aromatic compound (b) of 80 mol % or more undesirably tends to degrade heat resistance when the produced soluble polyfunctional vinyl aromatic copolymer is cured.

A component (c) except the ethylvinyl aromatic compound as the other monomer (b) is used in an amount of less than 40 mol %, preferably less than 30 mol %, more preferably less than 25 mol %, and particularly preferably less than 20 mol % with respect to a total amount of the monomers. A content of the component (c) of 40 mol % or more undesirably degrades heat resistance when the produced soluble polyfunctional vinyl aromatic copolymer is cured.

In the producing method of the present invention, a trivinyl aromatic compound, another divinyl compound, and another monovinyl compound expect for the components (a) to (c) can be used within a range not impairing the effect of the present invention. Specific examples of the trivinyl aromatic compound include: 1,2,4-trivinylbenzene; 1,3,5-trivinylbenzene; 1,2,4-triisopropenylbenzene; 1,3,5-triisopropenylbenzene; 1,3,5-trivinylnaphthalene; and 3,5,4'-trivinylbiphenyl. Examples of the other divinyl compound include diene compounds such as butadiene and isoprene. Examples of the other monovinyl compounds include an alkylvinyl ether, an aromatic vinyl ether, isobutene, and diisobutylene. Those compounds may be used alone, or two or more kinds thereof may be used in combination. Those other monomers are used within a range of less than 30 mol % with respect to a total amount of the monomers.

In the polyfunctional vinyl aromatic copolymer of the present invention or a polyfunctional vinyl aromatic polymer synthesized through the production method of the present invention, a mole fraction of structural units containing vinyl groups derived from the divinyl aromatic compound and represented by the formulae (a1) and (a2), satisfies the expression $(a1)/[(a1)+(a2)] \geqq 0.5$. The mole fraction thereof is preferably 0.7 or more, and particularly preferably 0.9 or more. A mole fraction of 0.5 or more allows production of a formed product having excellent heat-curability, heat resistance after curing, and mechanical properties.

The polyfunctional vinyl aromatic copolymer must have an indan structure represented by the general formula (2) in its main chain skeleton. In the general formula (2), Y represents an unsaturated aliphatic hydrocarbon group such as a vinyl group, an aromatic hydrocarbon group such as a phenyl group, or hydrocarbon group-substituted products thereof. 0 to 4 hydrocarbon groups may be substituted. Y may represent a divalent hydrocarbon group having an indan structure and capable of forming a condensed ring with a benzene ring to form a naphthalene ring or the like, and the divalent hydrocarbon group may have a substituent.

The indan structure represented by the general formula (2) is formed by an attack of an active site on a terminal of a growing polymer chain on aromatic rings of the structural units derived from the divinyl aromatic compound and the monovinyl aromatic compound in production of the polyfunctional vinyl aromatic copolymer through the production method of the present invention under specific production conditions of a solvent, a catalyst, a temperature, and the like. An amount of the indan structure present is preferably 0.01 ml % or more, more preferably 0.1 mol % or more, furthermore preferably 1 mol % or more, particularly preferably 3 mol % or more, and most preferably 5 to 20 mol % with respect to a total amount of the structural units. The absence of the indan structure in the main chain skeleton of the polyfunctional vinyl aromatic copolymer of the present invention undesirably provides insufficient heat resistance and solubility into a solvent.

The soluble polyfunctional vinyl aromatic copolymer can be obtained through the production method of the present invention. The soluble polyfunctional vinyl aromatic copolymer obtained through the production method of the present invention is desirably the soluble polyfunctional vinyl aromatic copolymer of the present invention or a compound mainly containing the same. Thus, in the case where the description of the soluble polyfunctional vinyl aromatic copolymer of the present invention and the description of the soluble polyfunctional vinyl aromatic polymer obtained through the production method of the present invention need not be differentiated, the description is assumed to be common to both compounds.

A number average molecular weight Mn (in standard polystyrene equivalents obtained through gel permeation chromatography) of the soluble polyfunctional vinyl aromatic copolymer is preferably 300 to 100,000, more preferably 400 to 50,000, and most preferably 500 to 20,000. Mn of less than 300 undesirably provides excessively low viscosity of the soluble polyfunctional vinyl aromatic copolymer and degrades workability. Mn of 100,000 or more is undesirable because gel formation occurs.

The soluble polyfunctional vinyl aromatic copolymer has a molecular weight distribution (Mw/Mn) determined from Mn and a weight average molecular weight Mw of 10 or less, preferably 5 or less, and more preferably 3.5 or less. Mw/Mn of more than 10 is undesirable because problems such as degradation of working properties and gel formation occur.

A content of metal ions in the soluble polyfunctional vinyl aromatic copolymer is preferably 500 ppm or less, more preferably 100 ppm or less, furthermore preferably 20 ppm or less, particularly preferably 1 ppm or less, and most preferably 0.1 ppm or less for each metal ion. A metal ion content of 500 ppm or more undesirably degrades electrical properties of the polymer.

The soluble polyfunctional vinyl aromatic copolymer of the present invention or the soluble polyfunctional vinyl aromatic copolymer obtained through the production method of the present invention may be formed into a formed material, a sheet, or a film, and may be applied to a semiconductor-related material or an optical material satisfying the properties such as low dielectric constant, low water absorption, and high heat resistance. Further, the soluble polyfunctional vinyl aromatic copolymer may be applied to a paint, a photosensitive material, an adhesive, a sewage treatment, a heavy metal scavenger, an ion-exchange resin, an antistatic agent, an antioxidant, an anti-fogging agent, a rust-preventive agent, an anti-dyeing agent, a disinfectant, an insecticide, a medical material, a flocculent, a surfactant, a lubricant, a solid fuel binder, a conductive treatment, and the like.

Examples of an optical member include a CD pick-up lens, a DVD pick-up lens, a Fax lens, an LBP lens, a polygon mirror, and a prism.

Best Mode for Carrying Out the Invention

Next, the present invention will be described by using examples, but the present invention is not limited to the examples. Note that any part in the examples represents parts by weight. Further, measurement of softening temperature and the like in the examples were performed in sample preparation and measurement through methods described below.

1) Molecular Weight and Molecular Weight Distribution of Polymer

Measurement of a molecular weight and a molecular weight distribution of a soluble polyfunctional vinyl aromatic copolymer was performed by using GPC (HLC-8120GPC, manufactured by Tosoh Corporation) and by using tetrahydrofuran (THF) as a solvent at a flow rate of 1.0 ml/minute and a column temperature of 40° C. The molecular weight of the copolymer was measured as a molecular weight in polystyrene equivalents by using a calibration curve of monodisperse polystyrene.

2) Structure of Polymer

A structure of the copolymer was determined through $^{13}$C-NMR and $^1$H-NMR analysis by using a nuclear magnetic resonance spectrometer (JNM-LA600, manufactured by JOEL Ltd). Chloroform-$d_2$ was used as a solvent, and a resonance line of tetrachloroethane-$d_2$ which is a solvent for NMR measurement was used as an internal standard.

3) Sample Preparation and Measurement of Glass Transition Temperature (Tg) and Softening Temperature A solution of a polymer composition was uniformly applied to a glass substrate such that a thickness after drying was 20 μm. Then, the whole was heated at 90° C. for 30 minutes by using a hot plate and dried. The obtained resin film on the glass substrate was set in a thermomechanical analysis (TMA) apparatus together with the glass substrate. The whole was heated to 220° C. at a temperature increase rate of 10° C./minute in a stream of nitrogen and was subjected to heat treatment at 220° C. for 20 minutes, to thereby remove the remaining solvent. The glass substrate was left standing to cool to room temperature. Then, an analysis probe was brought into contact with the sample in the TMA apparatus, and measurement was performed by scanning from 30° C. to 360° C. at a temperature increase rate of 10° C./minute in a stream of nitrogen, to thereby determine a softening temperature through a tangent method. In the case where the probe does not penetrate the resin film due to heat resistance of the sample and a probe penetration distance was not smaller than a film thickness, a temperature at which the probe penetrated was determined in addition to the softening temperature and the penetration distance with respect to the film thickness was represented in %.

4) Measurement of Heat Decomposition Temperature and Carbonization Yield

The measurement of the heat decomposition temperature and carbonization yield of the hyperbranched polymer and the hyperbranched block copolymer was performed by setting the sample in a thermogravimetric analysis (TGA) apparatus and scanning from 30° C. to 650° C. at a temperature increase rate of 10° C./minute in a stream of nitrogen. The heat decomposition temperature was determined through a tangent method, and a sample residual amount at 550° C. was determined as the carbonization yield.

EXAMPLE

Example 1

0.0481 mol (6.8 ml) of divinylbenzene, 0.0362 mol (5.2 ml) of ethylvinylbenzene, 4.7 ml of a dichloroethane solution (concentration: 0.634 mmol/ml) of 1-chloroethylbenzene (3.0 mmol), 6.5 ml of a dichloroethane solution (concentration: 0.035 mmol/ml) of n-tetrabutylammonium chloride (0.225 mmol), and 50 ml of dichloroethane (dielectric constant: 10.3) were charged into a 100 ml-flask. 2.2 ml of a dichloroethane solution (concentration: 0.068 mmol/ml) having 0.15 mmol of $SnCl_4$ was added to the mixture at 70° C., and the whole was reacted for an hour. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 6.74 g (yield: 61.4 wt %) of a copolymer A. A polymerization activity was 44.9 (g polymer/mmolSn·hr).

The obtained copolymer A had Mw of 7,670, Mn of 3,680, and Mw/Mn of 2.1. $^{13}$C-NMR and $^1$H-NMR analysis revealed that the copolymer A contained 51 mol % of a structural unit derived from divinylbenzene and 49 mol % of a structural unit derived from ethylvinylbenzene. The copolymer A had an indan structure. A ratio of the indan structure presents at 7.5 mol % with respect to the structural units of all monomers. A mole fraction of structural units represented by the general formula (a1) was 0.99 with respect to the total amount of structural units represented by the general formulae (a1) and (a2). The results of TMA measurement revealed that Tg was 291° C. and a softening temperature was 300° C. or higher. The results of TGA measurement revealed that a heat decomposition temperature was 417° C. and a carbonization yield was 28%.

The copolymer A was soluble in toluene, xylene, THF, dichloroethane, dichloromethane, and chloroform, and no gelling was observed. A cast film of the copolymer A was a transparent film without cloudiness.

Example 2

0.0481 mol (6.84 ml) of divinylbenzene, 0.0362 mol (5.16 ml) of ethylvinylbenzene, 6.3 ml of a dichloroethane solution. (concentration: 0.634 mmol/ml) of 1-chloroethylbenzene (4.0 mmol), 1.1 ml of a dichloroethane solution (concentration: 0.135 mmol/ml) of n-tetrabutylammonium bromide (0.15 mmol), and 50 ml of dichloroethane (dielectric constant: 10.3) were charged into a 100 ml-flask. 1.5 ml of a dichloroethane solution (concentration: 0.068 mmol/ml) having 0.15 mmol of SnCl$_4$ was added to the mixture at 70° C., and the whole was reacted for an hour. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 5.46 g (yield: 49.8 wt %) of a copolymer B. A polymerization activity was 49.8 (g polymer/mmolSn·hr).

Example 3

0.0481 mol (6.84 ml) of divinylbenzene, 0.0362 mol (5.16 ml) of ethylvinylbenzene, 7.0 ml of a dichloroethane solution (concentration: 0.573 mmol/ml) of 1-bromoethylbenzene (4.0 mmol), 1.1 ml of a dichloroethane solution (concentration: 0.135 mmol/ml) of n-tetrabutylammonium bromide (0.15 mmol), and 50 ml of dichloroethane (dielectric constant: 10.3) were charged into a 100 ml-flask. 1.5 ml of a dichloroethane solution (concentration: 0.068 mmol/ml) having 0.15 mmol of SnCl$_4$ was added to the mixture at 70° C., and the whole was reacted for an hour. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 4.64 g (yield: 42.3 wt %) of a copolymer C. A polymerization activity was 42.3 (g polymer/mmolSn·hr).

Example 4

0.0481 mol (6.84 ml) of divinylbenzene, 0.0362 mol (5.16 ml) of ethylvinylbenzene, 8.7 ml of a dichloroethane solution (concentration: 0.461 mmol/ml) of tert-butylbromide (4.0 mmol), 1.1 ml of a dichloroethane solution (concentration: 0.135 mmol/ml) of n-tetrabutylammonium bromide (0.17 mmol), and 50 ml of dichloroethane (dielectric constant: 10.3) were charged into a 100 ml-flask. 1.5 ml of a dichloroethane solution (concentration: 0.068 mmol/ml) having 0.15 mmol of SnCl$_4$ was added to the mixture at 70° C., and the whole was reacted for an hour. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 2.99 g (yield: 27.3 wt %) of a copolymer D. A polymerization activity was 27.3 (g polymer/mmolSn·hr).

Comparative Example 1

0.0481 mole (6.84 ml) of divinylbenzene, 0.0362 mole (5.16 ml) of ethylvinylbenzene, 12.0 mg of a cobalt-based chain transfer catalyst represented by the following general formula (3):

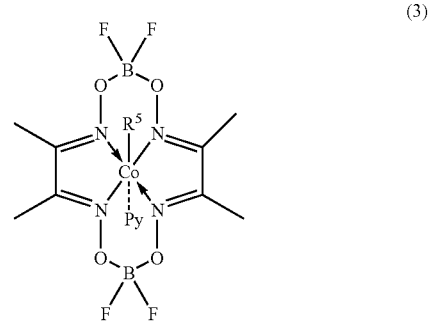

wherein R$^5$ represents an isopropyl group; and Py represents a pyridyl group, and 150 ml of tetrahydrofuran were charged into a 300-ml flask. Then, 50.0 mg of 2,2'-azobis(2,4-dimethylvaleronitrile) was added into the mixture at 50° C., and the whole was reacted for 72 hours. The reaction mixture was charged into a large amount of methanol at room temperature, to thereby precipitate a polymer. The obtained polymer was washed with methanol, separated through filtration, dried, and weighed, to thereby obtain 3.15 g (yield: 28.7 wt %) of a copolymer R. A polymerization activity was 0.15 (g polymer/mmolAlBN·hr).

The obtained copolymer R contained gel, and thus a THF-soluble component alone had Mw of 94,600, Mn of 12,800, and Mw/Mn of 7.4.

Comparative Example 2

0.057 mol (8.1 ml) of divinylbenzene, 0.043 mol (6.1 ml) of ethylvinylbenzene, 5.0 ml of a dichloroethane solution (concentration: 0.063 mmol/ml) of 1-chloroethylbenezene (0.315 mmol), and 50 ml of dichloroethane (dielectric constant: 10.3) were charged into a 100 ml-flask. 0.73 ml of a dichloroethane solution (concentration: 0.068 mmol/ml) having 0.05 mmol of SnCl$_4$ was added to the mixture at 70° C., and the whole was reacted for 20 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 7.59 g (yield: 58.3 wt %) of a copolymer S. A polymerization activity was 456 (g polymer/mmolSn·hr).

The copolymers A to D and S obtained in Examples and Comparative Examples were each soluble in toluene, xylene, THF, dichloroethane, dichloromethane, and chloroform, and no gel formation was observed. A cast film of each of the copolymers was a transparent film without cloudiness. However, in the copolymer R obtained in Comparative Example R, gel formation was confirmed and the copolymer was partly soluble in the above-mentioned solvents. A cast film of this copolymer was a transparent film with slight cloudiness.

Table 1 shows Mw, Mn, Mw/Mn, the content of the structural unit derived from divinylbenzene (DVB mol %), the content of the structural unit derived from ethylvinylbenzene (EVB mol %), the content of the indan structure (IND mol %), the mole fraction (a1 mole fraction) of the structural unit represented by the general formula (a1) with respect to the total amount of the structural units represented by the general formulae (a1) and (a2), Tg, the softening temperature, the heat decomposition temperature, and the carbonization yield of the copolymers A to D and R to S obtained in Examples 1 to 4 and Comparative Examples 1 and 2.

tural unit derived from divinylbenzene and 3 mol % of a structural unit derived from ethylvinylbenzene. The copolymer A had an indan structure. A ratio of the indan structure presents at 2.1 mol % with respect to the structural units of all monomers. A mole fraction of structural units represented by the general formula (a1) was 0.99 with respect to the total amount of structural units represented by the general formulae (a1) and (a2). The results of TMA measurement revealed that Tg was 291° C. and a softening temperature was 300° C. or higher. The results of TGA measurement revealed that a heat decomposition temperature was 418° C. and a carbonization yield was 29%.

Example 6

0.144 mol (21.3 ml) of divinylbenzene, 0.006 mol (0.86 ml) of ethylvinylbenzene, 5.5 ml of a dichloroethane solution (concentration: 0.063 mmol/ml) of 1-chloroethylbenzene (0.35 mmol), and 300 ml of dichloroethane (dielectric constant: 10.3) and 50 ml of toluene (dielectric constant: 2.35) were charged into a 500 ml-flask. 7.3 ml of a dichloroethane solution (concentration: 0.068 mmol/ml) having 0.50 mmol of $SnCl_4$ was added to the mixture at 70° C., and the whole was reacted for 30 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol,

TABLE 1

| | Copolymer | | | | | |
|---|---|---|---|---|---|---|
| | A | B | C | D | R | S |
| Mw | 7670 | 4180 | 5830 | 4380 | 94600 | 548000 |
| Mn | 3680 | 2560 | 2670 | 2450 | 12800 | 14000 |
| Mw/Mn | 2.1 | 1.6 | 2.2 | 1.8 | 7.4 | 39.1 |
| DVB mol % | 51 | 52 | 53 | 55 | 58 | 53 |
| EVB mol % | 49 | 48 | 47 | 45 | 42 | 47 |
| IND mol % | 7.5 | 7.5 | 6.2 | 7.2 | 0 | 0.7 |
| a1 Mole fraction | 0.99 | 0.99 | 0.99 | 0.98 | 0.25 | 0.99 |
| Tg ° C. | 291 | 287 | 284 | 283 | 262 | 292 |
| Softening temp. ° C. | >300 | >300 | >300 | >300 | >300 | >300 |
| Heat decomposition temp. ° C. | 417 | 413 | 411 | 415 | 375 | 414 |
| Carbonization yield % | 28 | 26 | 27 | 25 | 12 | 28 |

Example 5

0.144 mol (21.3 ml) of divinylbenzene, 0.006 mol (0.86 ml) of ethylvinylbenzene, 5.5 ml of a dichloroethane solution (concentration: 0.063 mmol/ml) of 1-chloroethylbenzene (0.35 mmol), and 350 ml of dichloroethane (dielectric constant: 10.3) were charged into a 500 ml-flask. 7.3 ml of a dichloroethane solution (concentration: 0.068 mmol/ml) having 0.50 mmol of $SnCl_4$ was added to the mixture at 70° C., and the whole was reacted for 3 hours. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 14.49 g (yield: 54.8 wt %) of a copolymer E. A polymerization activity was 9.66 (g polymer/mmolSn·hr).

The obtained copolymer E had Mw of 34,000, Mn of 6,160, and Mw/Mn of 5.5. $^{13}C$-NMR and $^1H$-NMR analysis revealed that the copolymer contained 97 mol % of a strucseparated through filtration, dried, and weighed, to thereby obtain 24.36 g (yield: 15.2 wt %) of a copolymer F. A polymerization activity was 17.4 (g polymer/mmolSn·hr).

Comparative Example 3

0.144 mol (21.3 ml) of divinylbenzene, 0.006 mol (0.86 ml) of ethylvinylbenzene, 25.0 mg of a cobalt-based chain transfer catalyst represented by the formula (3), and 350 ml of tetrahydrofuran were charged into a 500 ml-flask. 100.0 mg of 2,2'-azobis(2,4-dimethyl valeronitrile) was added to the mixture at 50° C., and the whole was reacted for 72 hours. Then, the reaction mixture was charged into a large amount of methanol at room temperature, to thereby precipitate a polymer. The obtained polymer was washed with methanol, separated through filtration, dried, and weighed, to thereby obtain 6.38 g (yield: 22.3 wt %) of a copolymer T. A polymerization activity was 0.022 (g polymer/mmolSn·hr).

The obtained copolymer T contained gel, and thus a THF-soluble component alone had Mw of 85,600, Mn of 12,300, and Mw/Mn of 7.0. Gel formation of the copolymer T was observed in toluene, xylene, THF, dichloroethane, dichloromethane, and chloroform, and the copolymer T was partly soluble in those solvents. A cast film of the copolymer T was a transparent film with slight cloudiness.

Example 7

0.108 mol (15.3 ml) of divinylbenzene, 0.005 mol (0.64 ml) of ethylvinylbenzene, 0.0375 mol (5.63 g) of acenaphthylene, 5.5 ml of a dichloroethane solution (concentration: 0.063 mmol/ml) of 1-chloroethylbenzene (0.35 mmol), and 350 ml of dichloroethane (dielectric constant: 10.3) were charged into a 500 ml-flask. 7.3 ml of a dichloroethane solution (concentration: 0.068 mmol/ml) having 0.50 mmol of $SnCl_4$ was added to the mixture at 70° C., and the whole was reacted for 3 hours. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 20.93 g (yield: 91.7 wt %) of a copolymer G. A polymerization activity was 14.0 (g polymer/mmolSn·hr).

Example 8

0.072 mol (10.3 ml) of divinylbenzene, 0.003 mol (0.43 ml) of ethylvinylbenzene, 0.075 mol (11.27 g) of acenaphthylene, 5.5 ml of a dichloroethane solution (concentration: 0.063 mmol/ml) of 1-chloroethylbenzene (0.35 mmol), and 350 ml of dichloroethane (dielectric constant: 10.3) were charged into a 500 ml-flask. 7.3 ml of a dichloroethane solution (concentration: 0.068 mmol/ml) having 0.50 mmol of $SnCl_4$ was added to the mixture at 70° C., and the whole was reacted for 3 hours. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 16.78 g (yield: 68.1 wt %) of a copolymer H. A polymerization activity was 11.2 (g polymer/mmolSn·hr).

Example 9

0.481 mol (68.5 ml) of divinylbenzene, 0.362 mol (51.6 ml) of ethylvinylbenzene, 16.6 ml of a dichloroethane solution (concentration: 0.063 mmol/ml) of 1-chloroethylbenzene (1.05 mmol), and 500 ml of dichloroethane (dielectric constant: 10.3) were charged into a 1,000 ml-flask. 22.0 ml of a dichloroethane solution (concentration: 0.068 mmol/ml) having 1.50 mmol of $SnCl_4$ was added to the mixture at 70° C., and the whole was reacted for 10 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 42.29 g (yield: 38.5 wt %) of a copolymer I. A polymerization activity was 188 (g polymer/mmolSn·hr).

Example 10

0.30 mol (68.0 ml) of divinylphenyl, 0.113 mol (25.9 ml) of ethylvinylphenyl, 16.6 ml of a dichloroethane solution (concentration: 0.063 mmol/ml) of 1-chloroethylbenzene (1.05 mmol), and 500 ml of dichloroethane (dielectric constant: 10.3) were charged into a 1,000 ml-flask. 22.0 ml of a dichloroethane solution (concentration: 0.068 mmol/ml) having 1.50 mmol of $SnCl_4$ was added to the mixture at 70° C., and the whole was reacted for 10 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 29.57 g (yield: 34.6 wt %) of a copolymer J. A polymerization activity was 132 (g polymer/mmolSn·hr).

Example 11

0.30 mol (54.1 g) of divinylnaphthalene, 0.03 mol (5.4 g) of ethylvinylnaphthalene, 16.6 ml of a dichloroethane solution (concentration: 0.063 mmol/ml) of 1-chloroethylbenzene (1.05 mmol), and 500 ml of dichloroethane (dielectric constant: 10.3) were charged into a 1,000 ml-flask. 22.0 ml of a dichloroethane solution (concentration: 0.068 mmol/ml) having 1.50 mmol of $SnCl_4$ was added to the mixture at 70° C., and the whole was reacted for 10 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 20.1 g (yield: 33.8 wt %) of a copolymer. K. A polymerization activity was 150 (g polymer/mmolSn·hr).

The copolymers E to K and S each of which was obtained in the examples described above were soluble in toluene, xylene, THF, dichloroethane, dichloromethane, and chloroform, and no gelling was observed. A cast film of each of those copolymers was a transparent film without cloudiness.

Table 2 shows Mw, Mn, Mw/Mn, the content of the structural unit derived from divinylbenzene (DVB content), the content of the structural unit derived from divinylbiphenyl (DVBp content), the content of the structural unit derived from divinylnaphthalene (DVN mol %), the content of the structural unit derived from ethylvinylbenzene (EVB mol %), the content of the structural unit derived from ethylvinylbiphenyl (EVBp mol %), the content of the structural unit derived from ethylvinylnaphthalene (EVN mol %), the content of the structural unit derived from acenaphthylene (ACN content mol %), the content of the indan structure (IND mol %), the mole fraction (a1 mole fraction) of the structural unit represented by the general formula (a1) with respect to the total amount of the structural units represented by the general formulae (a1) and (a2), Tg, the softening temperature, the heat decomposition temperature, and the carbonization yield of the copolymers E to K and T obtained in Examples 5 to 11 and Comparative Example 3.

TABLE 2

| | Copolymer | | | | | | | |
|---|---|---|---|---|---|---|---|---|
| | E | F | G | H | I | J | K | T |
| Mw | 34000 | 4630 | 12000 | 15500 | 22800 | 18400 | 15800 | 85600 |
| Mn | 6160 | 1850 | 3700 | 4400 | 7090 | 5120 | 3860 | 12300 |
| Mw/Mn | 5.5 | 2.5 | 3.3 | 3.5 | 3.2 | 3.6 | 4.1 | 7.0 |
| DVB mol % | 97 | 98 | 75.8 | 55.5 | 59 | | | 95 |
| DVBp mol % | | | | | | 75.4 | | |
| DVN mol % | | | | | | | 93.1 | |
| EVB mol % | 3 | 2 | 3.2 | 2.3 | 41 | | | 5 |
| EVBp mol % | | | | | | 24.6 | | |
| EVN mol % | | | | | | | 6.9 | |
| ACN mol % | | | 21.0 | 42.2 | | — | | — |
| IND mol % | 2.1 | 1.8 | 1.0 | 1.1 | 3.5 | 5.2 | 5.3 | 0 |
| a1 Mole fraction | 0.99 | 0.98 | 0.99 | 0.98 | 0.99 | 0.99 | 0.98 | 0.27 |
| Tg ° C. | 291 | 287 | 286 | 281 | 286 | 291 | 267 | 278 |
| Softening temp. ° C. | >300 | >300 | >300 | >300 | >300 | >300 | >300 | >300 |
| Heat decomposition temp. ° C. | 418 | 415 | 402 | 395 | 402 | 421 | 417 | 382 |
| Carbonization yield % | 29 | 28 | 25 | 23 | 27 | 32 | 30 | 14 |

Example 12

0.096 mol (12.5 g) of divinylbenzene, 0.073 mol (9.64 g) of ethylvinylnaphthalene, 1.84 ml of a toluene solution (concentration: 8.69 mmol/ml) of benzyl chloride (16.0 mmol), and 93 ml of toluene (dielectric constant: 2.3) were charged into a 300 ml-flask. 0.88 ml of a toluene solution (concentration: 1.25 mmol/ml) having 1.10 mmol of $SnCl_4$ was added to the mixture at 50° C., and the whole was reacted for 120 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 4.55 g (yield: 2.07 wt %) of a copolymer U. A polymerization activity was 2.07 (g polymer/mmolSn·hr).

Example 13

0.096 mol (12.5 g) of divinylbenzene, 0.073 mol (9.6 g) of ethylvinylbenzene, 5.06 ml of a toluene solution (concentration: 8.69 mmol/ml) of benzyl chloride (44.0 mmol), and 80 ml of toluene (dielectric constant: 2.3) were charged into a 300 ml-flask. 2.51 ml of a toluene solution (concentration: 1.25 mmol/ml) having 3.14 mmol of $SnCl_4$ was added to the mixture at 50° C., and the whole was reacted for 120 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 8.33 g (yield: 37.9 wt %) of a copolymer V. A polymerization activity was 1.33 (g polymer/mmolSn·hr).

Example 14

0.096 mol (12.5 g) of divinylbenzene, 0.073 mol (9.64 g) of ethylvinylbenzene, 1.84 ml of a toluene solution (concentration: 8.69 mmol/ml) of benzyl chloride (16.0 mmol), and 92 ml of toluene (dielectric constant: 2.3) were charged into a 300 ml-flask. 0.88 ml of a toluene solution (concentration: 1.25 mmol/ml) having 1.10 mmol of $SnCl_4$ was added to the mixture at 50° C., and the whole was reacted for 120 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 8.84 g (yield: 40.2 wt %) of a copolymer W. A polymerization activity was 4.02 (g polymer/mmolSn·hr).

Example 15

0.096 mol (12.5 g) of divinylbenzene, 0.073 mol (9.64 g) of ethylvinylbenzene, 1.84 ml of a toluene solution (concentration: 8.69 mmol/ml) of benzyl chloride (16.0 mmol), and 92 ml of toluene (dielectric constant: 2.3) were charged into a 300 ml-flask. 0.88 ml of a toluene solution (concentration: 1.25 mmol/ml) having 1.10 mmol of $SnCl_4$ was added to the mixture at 50° C., and the whole was reacted for 120 minutes. A polymerization reaction was stopped with a small amount of methanol subjected to bubbling with nitrogen. Then, the reaction mixture was charged into a large amount of methanol, to thereby precipitate a polymer. The obtained polymer was washed with methanol, separated through filtration, dried, and weighed, to thereby obtain 5.25 g (yield: 23.9 wt %) of a copolymer X. A polymerization activity was 2.39 (g polymer/mmolSn·hr).

The copolymers U to X each of which was obtained in the examples described above were soluble in toluene, xylene, THF, dichloroethane, dichloromethane, and chloroform, and no gelling was observed. A cast film of each of those copolymers was a transparent film without cloudiness.

Table 3 shows Mw, Mn, Mw/Mn, the content of the structural unit derived from divinylbenzene (DVB mol %), the content of the structural unit derived from ethylvinylbenzene (EVB mol %), the content of the indan structure (IND mol %), the mole fraction (a1 mole fraction) of the structural unit represented by the general formula (a1) with respect to the total amount of the structural units represented by the general formulae (a1) and (a2), Tg, the softening temperature, the heat decomposition temperature, and the carbonization yield of the copolymers U to X obtained in Examples 12 to 15.

TABLE 3

| | Copolymer | | | |
|---|---|---|---|---|
| | U | V | W | X |
| Mw | 6980 | 11400 | 21600 | 9030 |
| Mn | 1790 | 2320 | 2910 | 1780 |
| Mw/Mn | 3.9 | 4.9 | 7.4 | 5.1 |
| DVB mol % | 56.0 | 57.3 | 57.6 | 57.1 |
| EVB mol % | 43.5 | 42.1 | 42.0 | 42.2 |
| IND mol % | 0.5 | 0.6 | 0.4 | 0.7 |
| a1 Mole fraction | 0.99 | 0.99 | 0.99 | 0.98 |
| Tg ° C. | 288 | 289 | 287 | 285 |
| Softening temp. ° C. | >300 | >300 | >300 | >300 |
| Heat decomposition temp. ° C. | 413 | 416 | 408 | 411 |
| Carbonization yield % | 27 | 28 | 29 | 29 |

INDUSTRIAL APPLICABILITY

The present invention can provide a soluble polyfunctional vinyl aromatic copolymer having improved heat resistance, heat decomposition resistance, solvent solubility, and workability.

What is claimed is:

1. A method of producing a soluble polyfunctional vinyl aromatic polymer having a controlled molecular weight distribution, comprising performing cationic polymerization of a monomer component containing 20 to 100 mol % of a divinyl aromatic compound (a) at a temperature of 20 to 120° C. in an organic solvent in the presence of a donor component selected from the group consisting of a quaternary ammonium salt, an ether-based compound having 3 or more carbon atoms, a thioether-based compound having 3 or more carbon atoms, and a sulfoxide-based compound having 2 or more carbon atoms with a Lewis acid catalyst and an initiator represented by the following general formula (1):

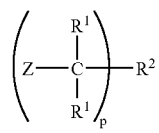

(1)

wherein $R^1$ represents a hydrogen atom or a monovalent hydrocarbon group having 1 to 6 carbon atoms, $R^2$ represents an aromatic hydrocarbon group or aliphatic hydrocarbon group of p-valence, Z represents a halogen atom, or an alkoxy group or acyloxy group having 1 to 6 carbon atoms, p represents an integer of 1 to 6, and when a plurality of $R^1$ and Z are present in a molecule, $R^1$ and Z may be identical to or different from each other.

2. A method of producing a soluble polyfunctional vinyl aromatic polymer having a controlled molecular weight distribution, comprising performing cationic polymerization of a monomer component containing 20 to 100 mol % of a divinyl aromatic compound (a) at a temperature of 20 to 120° C. in at least one organic solvent having a dielectric constant of 2 to 15 with a Lewis acid catalyst and an initiator represented by the following general formula (1):

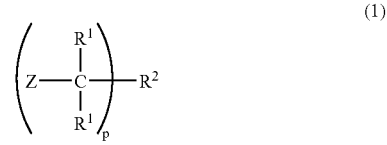

(1)

wherein $R^1$ represents a hydrogen atom or a monovalent hydrocarbon group having 1 to 6 carbon atoms, $R^2$ represents an aromatic hydrocarbon group or aliphatic hydrocarbon group of p-valence, Z represents a halogen atom, or an alkoxy group or acyloxy group having 1 to 6 carbon atoms, p represents an integer of 1 to 6, and when a plurality of $R^1$s and Zs are present in a molecule, $R^1$s and Zs may be identical to or different from each other.

3. A method of producing a soluble polyfunctional vinyl aromatic polymer according to claim 1, wherein the monomer component comprises 30 to 99 mol % of a divinyl aromatic compound (a) and 1 to 70 mol % of a monovinyl aromatic compound (b).

4. A method of producing a soluble polyfunctional vinyl aromatic polymer according to claim 1, characterized in that the donor component comprises at least one compound selected from the group consisting of a tetraalkylammonium halide, a dialkyl ether having 3 or more carbon atoms, a bisalkoxy alkyl, a cycloalkyl ether, a biphenyl ether-based compound, a dialkyl thioether, a bisthioalkoxy alkyl, a cycloalkyl thioether, a biphenyl sulfide-based compound, a thioether-based compound, and a dialkyl sulfoxide-based compound having 2 or more carbon atoms.

5. A method of producing a soluble polyfunctional vinyl aromatic polymer according to claim 1, characterized in that the Lewis acid catalyst comprises a halogenated metal having Lewis acidity.

6. A method of producing a soluble polyfunctional vinyl aromatic polymer according to claim 5, wherein the soluble polyfunctional vinyl aromatic polymer has a mole fraction of structural units derived from the divinyl aromatic compound (a) and represented by the following formulae (a1) and (a2):

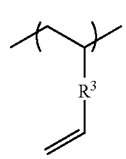

(a1)

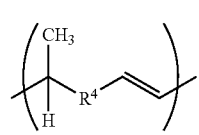

(a2)

wherein $R^3$ and $R^4$ each independently represent an aromatic hydrocarbon group having 6 to 30 carbon atoms, the mole fraction satisfying the following expression (a1)/[(a1)+

(a2)]≧0.5, has 0 to 20 mol % of an indan structure represented by the following general formula (2) in a main chain skeleton:

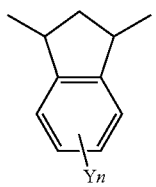

(2)

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, has a number average molecular weight Mn of 300 to 100,000, has a molecular weight distribution (Mw/Mn) represented by a ratio of a weight average molecular weight Mw to the number average molecular weight Mn of 10.0 or less, and is soluble in toluene, xylene, tetrahydrofuran, dichloroethane, or chloroform.

7. A method of producing a soluble polyfunctional vinyl aromatic polymer according to claim 1, wherein the polymerization is performed in an organic solvent capable of dissolving a soluble polyfunctional vinyl aromatic copolymer by using the donor component, the Lewis acid catalyst, and the initiator represented by the general formula (1) within a range of 0.001 to 100 moles of the Lewis acid and 0.001 to 10 moles of the donor component per 1 mole of the initiator.

8. A soluble polyfunctional vinyl aromatic copolymer comprising an indan structure represented by the following general formula (2) in a main chain skeleton:

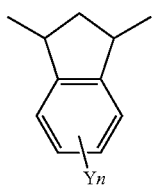

(2)

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, characterized in that:

20 mol % or more of a repeating unit derived from the divinyl aromatic compound (a) is included in the polyfunctional vinyl aromatic copolymer comprising structural units derived from monomers formed of a divinyl aromatic compound (a) and a monovinyl aromatic compound (b); and a mole fraction of structural units derived from the divinyl aromatic compound (a) and represented by the following formulae (a1) and (a2):

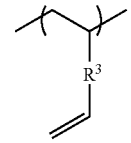

(a1)

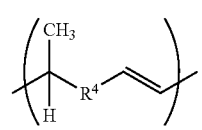

(a2)

wherein $R^3$ and $R^4$ each independently represent an aromatic hydrocarbon group having 6 to 30 carbon atoms, satisfies the following expression (a1)/[(a1)+(a2)]≧0.5.

9. A method of producing a soluble polyfunctional vinyl aromatic polymer according to claim 2, wherein the soluble polyfunctional vinyl aromatic polymer has a mole fraction of structural units derived from the divinyl aromatic compound (a) and represented by the following formulae (a1) and (a2):

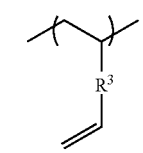

(a1)

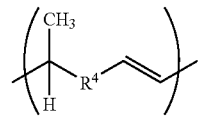

(a2)

wherein $R^3$ and $R^4$ each independently represent an aromatic hydrocarbon group having 6 to 30 carbon atoms, the mole fraction satisfying the following expression (a1)/[(a1)+ (a2)]≧ 0.5, has 0 to 20 mol % of an indan structure represented by the following general formula (2) in a main chain skeleton:

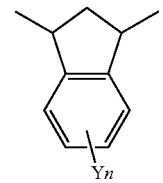

(2)

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, has a number average molecular weight Mn of 300 to 100,000, has a molecular weight distribution (Mw/Mn) represented by a ratio of a weight average molecular weight Mw to the number average molecular weight Mn of 10.0 or less, and is soluble in toluene, xylene, tetrahydrofuran, dichloroethane, or chloroform.

10. A method of producing a soluble polyfunctional vinyl aromatic polymer according to claim 3, wherein the soluble polyfunctional vinyl aromatic polymer has a mole fraction of structural units derived from the divinyl aromatic compound (a) and represented by the following formulae (a1) and (a2):

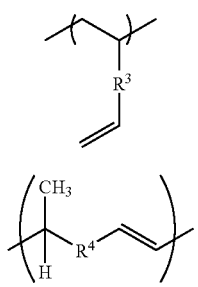

(a1)

(a2)

wherein $R^3$ and $R^4$ each independently represent an aromatic hydrocarbon group having 6 to 30 carbon atoms, the mole fraction satisfying the following expression $(a1)/[(a1)+(a2)] \geq 0.5$, has 0 to 20 mol % of an indan structure represented by the following general formula (2) in a main chain skeleton:

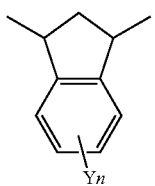

(2)

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, has a number average molecular weight Mn of 300 to 100,000, has a molecular weight distribution (Mw/Mn) represented by a ratio of a weight average molecular weight Mw to the number average molecular weight Mn of 10.0 or less, and is soluble in toluene, xylene, tetrahydrofuran, dichloroethane, or chloroform.

11. A method of producing a soluble polyfunctional vinyl aromatic polymer according to claim 4, wherein the soluble polyfunctional vinyl aromatic polymer has a mole fraction of structural units derived from the divinyl aromatic compound (a) and represented by the following formulae (a1) and (a2):

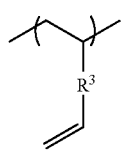

(a1)

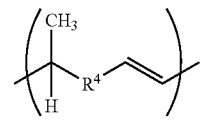

(a2)

wherein $R^3$ and $R^4$ each independently represent an aromatic hydrocarbon group having 6 to 30 carbon atoms, the mole fraction satisfying the following expression $(a1)/[(a1)+(a2)] \geq 0.5$, has 0 to 20 mol % of an indan structure represented by the following general formula (2) in a main chain skeleton:

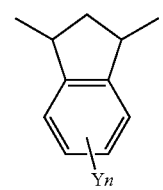

(2)

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, has a number average molecular weight Mn of 300 to 100,000, has a molecular weight distribution (Mw/Mn) represented by a ratio of a weight average molecular weight Mw to the number average molecular weight Mn of 10.0 or less, and is soluble in toluene, xylene, tetrahydrofuran, dichloroethane, or chloroform.

12. A method of producing a soluble polyfunctional vinyl aromatic polymer according to claim 2, wherein the monomer component comprises 30 to 99 mol % of a divinyl aromatic compound (a) and 1 to 70 mol % of a monovinyl aromatic compound (b).

13. A method of producing a soluble polyfunctional vinyl aromatic polymer according to claim 12, wherein the soluble polyfunctional vinyl aromatic polymer has a mole fraction of structural units derived from the divinyl aromatic compound (a) and represented by the following formulae (a1) and (a2):

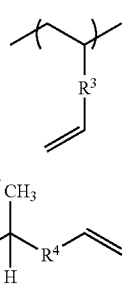

(a1)

(a2)

wherein $R^3$ and $R^4$ each independently represent an aromatic hydrocarbon group having 6 to 30 carbon atoms, the mole fraction satisfying the following expression $(a1)/[(a2)+(a2)] \geq 0.5$, has 0 to 20 mol % of an indan structure represented by the following general formula (2) in a main chain skeleton:

(2)

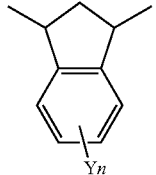

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, has a number average molecular weight Mn of 300 to 100,000, has a molecular weight distribution (Mw/Mn) represented by a ratio of a weight average molecular weight Mw to the number average molecular weight Mn of 10.0 or less, and is soluble in toluene, xylene, tetrahydrofuran, dichloroethane, or chloroform.

14. A method of producing a soluble polyfunctional vinyl aromatic polymer according to claim 2, characterized in that the Lewis acid catalyst comprises a halogenated metal having Lewis acidity.

15. A method of producing a soluble polyfunctional vinyl aromatic polymer according to claim 14, wherein the soluble polyfunctional vinyl aromatic polymer has a mole fraction of structural units derived from the divinyl aromatic compound (a) and represented by the following formulae (a1) and (a2):

(a1)

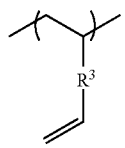

-continued (a2)

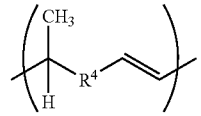

wherein $R^3$ and $R^4$ each independently represent an aromatic hydrocarbon group having 6 to 30 carbon atoms, the mole fraction satisfying the following expression $(a1)/[(a1)+(a2)] \geqq 0.5$, has 0 to 20 mol % of an indan structure represented by the following general formula (2) in a main chain skeleton:

(2)

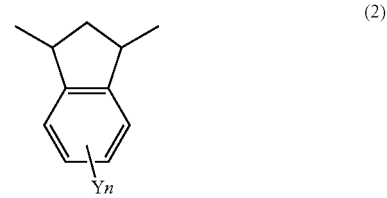

wherein Y represents a saturated or unsaturated aliphatic hydrocarbon group, an aromatic hydrocarbon group, an aromatic ring condensed to a benzene ring, or a substituted aromatic ring, and n represents an integer of 0 to 4, has a number average molecular weight Mn of 300 to 100,000, has a molecular weight distribution (Mw/Mn) represented by a ratio of a weight average molecular weight Mw to the number average molecular weight Mn of 10.0 or less, and is soluble in toluene, xylene, tetrahydrofuran, dichloroethane, or chloroform.

* * * * *